Oct. 17, 1961 R. H. SNEDEKER 3,004,296
PROCESS FOR PREPARING POLY (ETHYLENE OXIDE) FILM BY CALENDERING
Filed Oct. 30, 1959
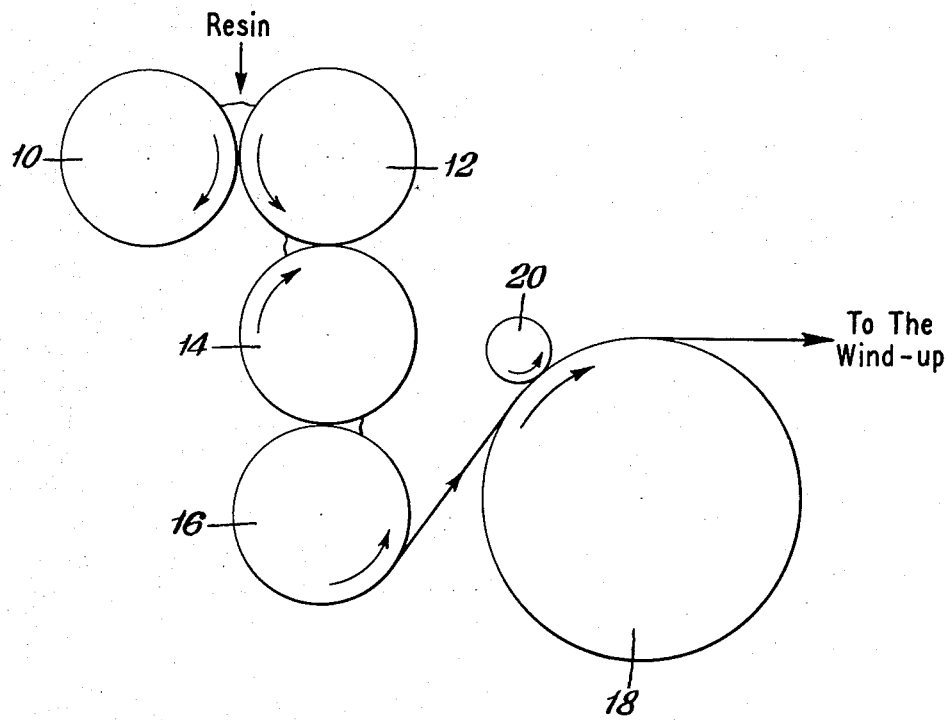
INVENTOR
ROBERT H. SNEDEKER
BY
ATTORNEY

3,004,296
PROCESS FOR PREPARING POLY (ETHYLENE OXIDE) FILM BY CALENDERING
Robert H. Snedeker, New Brunswick, N.J., assignor to Union Carbide Corporation, a corporation of New York
Filed Oct. 30, 1959, Ser. No. 849,903
4 Claims. (Cl. 18—57)

This invention relates in general to sheets and films of poly(ethylene oxide) and to the process for forming same. More particularly, the invention relates to a novel calendering process whereby sheets and films of poly(ethylene oxide) can be produced which exhibit greatly improved resistance to constant strain cracking or rupture.

Over the course of the past twenty years an enormous amount of effort has been expended by the plastics industry generally to produce a commercially suitable, water-soluble packaging film material. Although a few such films have been developed, as for instance, from polyvinyl alcohol and methyl cellulose, full commercial exploitation has been retarded to a considerable degree by the relatively high price of these materials.

Potentially poly(ethylene oxide) offers considerable economic benefits, and in addition offers the advantages of greater water solubility than polyvinyl alcohol, substantially lower film-sealing temperature requirements than either polyvinyl alcohol or methyl cellulose, and freedom from need of plasticizing additives. The latter advantage is particularly important in food packaging applications because of the elimination of a potential source of toxic material.

Moreover, polyvinyl alcohol and methyl cellulose do not possess the properties necessary for fabrication by calendering means. Nor has any calendering process been heretofore discovered which is capable of producing a commercially suitable poly(ethylene oxide) film product. Previous attempts in this regard have only succeeded in producing a sheet or film having so great a proclivity to crack in the transverse direction as to cause the roll of film to split wide open within a period of a few hours, or at most a few days.

It is therefore the general object of this invention to provide a calendering process for preparing crack-resistant commercially suitable sheets and films of poly(ethylene oxide).

The general objectives, as well as others which will be readily apparent from the specification and appended claims are accomplished in accordance with the process of the present invention which includes the steps of passing a fluxed continuum of poly(ethylene oxide) having a solution viscosity of between about 1,000 and 40,000 centipoises successively through the nips formed by a series of at least three calender rolls, the last two rolls of said series being controlled within certain critical temperature limits, whereby a film of said poly(ethylene oxide) is produced, and thereafter immediately and rapidly quenching said film to a temperature of about 30° C. or less.

The resin employed in the present process is critical in that only those ethylene oxide homopolymers which have a solution viscosity of from about 1,000 to about 40,000 centipoises are suitable. By "solution viscosity" as used herein in the specification and in the appended claims is meant the numerical value in centipoises of a solution of 0.1 gram of the poly(ethylene oxide) in 100 grams of water at 23° C. Because of their roll release properties and because of their particular suitability for very thin film formation, those poly(ethylene oxide) polymers which exhibit a solution viscosity of from about 2,500 to about 25,000 centipoises are preferred resins.

Ethylene oxide polymers which are suitable for the application of the novel film and sheet forming process of the present invention have been produced heretofore by several methods. For instance a suitable polymer may be produced by polymerizing ethylene oxide in contract with certain metal carbonate catalysts, such as calcium carbonate, barium carbonate, strontium carbonate, and others. These metal carbonate catalysts are advantageously employed in concentrations in the range of from about 0.3 to 3 parts by weight per 100 parts by weight of ethylene oxide. The polymerization reaction can be conducted in the liquid phase at a temperature in the range from about 70° C. to about 150° C. Preferably the metal carbonate catalyst contains not more than one part by weight of catalyst. It is also preferred that the carbonate catalyst be free from ions which reduced their catalytic activity such as, for example, chlorate and thiosulfate ions.

The preparation of poly(ethylene oxide) in granular form can be accomplished by polymerizing ethylene oxide in contact with about 0.2 to about 10 parts by weight, per 100 parts by weight of monomer, of a catalyst such as the alkaline earth metal amides, hexammoniates, or the decomposition products of hexammoniates. The polymerization reaction is preferably conducted at a temperature in the range from about 0° C. to 70° C. and is carried out in the presence of a liquid organic medium such as the normally liquid straight and branch chain saturated hydrocarbons, cyclic and alkyl-substituted cyclic saturated hydrocarbons, and the like, e.g., heptane, methylcyclopentane, etc., in which ethylene oxide is soluble and the poly(ethylene oxide) is insoluble. Agitation of the reaction mixture during the polymerization results in the production of granular ethylene oxide polymer which can be recovered from the reaction mixture by decanting the organic medium and vacuum drying the ethylene oxide polymer. The poly(ethylene oxide) is obtained in a granular state, i.e., a finely-divided solid particle resembling in particle size finely-divided sand.

It is, of course, not necessary that the poly(ethylene oxide) having the proper solution viscosity for purposes of the present invention be produced directly by polymerization from monomeric ethylene oxide. Polymers having the required solution viscosity may also be prepared by heat processing or degrading polymers which, when originally produced, have solution viscosities too high in value for the present invention.

In the practice of this invention it has been found that the temperatures of certain of the calender rolls are narrowly critical. However, any of the well-known and commercially available calenders such as the inverted L-type, the vertical stack, or the Z-type are readily adapted to the conditions required for the practice of the present invention so long as the calender consists of at least three cooperating calender rolls. A calender having as many as six, or even more, rolls is equally suitable, and in some instances preferred because of the availability of rolls which can serve as means for fluxing the resin mass before the continuum of fluxed resin is fed to the rolls which function as the true calendering rolls.

As used throughout the specification and in the appended claims, the term fluxing is intended to mean any of the well-known methods of treatment whereby a polymer mass is heated and blended to achieve compositional and thermal homogeniety and further whereby the polymer mass is brought to a confluent state in which there is exhibited plastic flow, i.e., certain flow properties characteristic of a liquid although it is not necessary that the flow be of the Newtonian type.

It is not, of course, necessary that the poly(ethylene oxide) resin be milled and fluxed on the calender. As is frequently done in conventional film calendering processes, the poly(ethylene oxide) resin can be milled and fluxed prior to being fed to the calender. It has been found that a Banbury fluxing cycle of from about 5 to 15 minutes at temperatures of from about 80° C. to about 160° C. is entirely satisfactory, although the temperature and time of the cycle as well as the particular fluxing means chosen can be selected by those skilled in the art according to preference without departing from the scope of the invention. It is only necessary that the resin batch be adequately and uniformly heated for subsequent calendering, as hereinafter defined.

In describing the present process insofar as the factor of critical calendar roll temperature is concerned, it is convenient to use such terms as first roll, penultimate roll, last roll, and the like. In order to avoid ambiguity, the penultimate roll and the last roll are intended to identify the pair of counter-rotating rolls forming the final bite through which the moving continuum of resin is subjected to pressure of the character normally applied to complete the formation of the film. Thus though the continuum of film is, in certain embodiments, subsequently fed through a nip between a pair of counter-rotating rolls which do not function as true calendering rolls, such pair of rolls is not considered to constitute the penultimate and last roll even though they contact the continuum later in point of time.

Regardless of the number of rolls comprising the calender, the temperature of the penultimate and of the last roll is narrowly critical. Both rolls must be within the range of 70° C. to 95° C. with the further requirement that the last roll have a higher temperature than the penultimate roll. Preferably, the last roll is about 4° C. to 5° C. higher, although the temperature differential can be greater or smaller depending on such factors as the thickness of the film, the exit speed of the film, etc., so long as the temperature of each roll is within the aforesaid critical range. It is particularly preferred that the penultimate roll be about 78 to 82° C. and the last roll be about 83 to 87° C.

The temperature of ante-penultimate roll and all other rolls prior in the series is not narrowly critical since the function of these rolls is the provision of adequate heating of the resin in preparation for the subsequent calendering. It has been found that the temperature of the ante-penultimate roll is suitably from about 20° C. to about 50° C., preferably from about 30° C. to 40° C. higher than the penultimate roll.

The temperature of calender rolls prior to the ante-penultimate roll in the calender series is not critical and can be readily adjusted over considerable limits by one skilled in the art as required to flux the resin. Optimum temperatures are dependent on such factors as the resin viscosity, the previous thermal history of the resin, and the desired film thickness.

As the fully formed poly(ethylene oxide) film is stripped from the last roll in the calendering operation, it is vital that the film be quenched to impart resistance to constant strain cracking or rupture to which poly(ethylene oxide) film is so notoriously susceptible. This type of cracking manifests itself principally in the transverse direction as a result of relatively low applied stresses, and is not of the type commonly called environmental stress cracking. Such failure in prior known poly(ethylene oxide) films is so severe that frequently within a period of a few hours the film is rendered useless.

By the provision of the present process, however, such cracking is eliminated by rapidly cooling, i.e., quenching, the film immediately after it has been removed from the last calender roll to a temperature of about 30° C. or less, preferably to below about 20° C. Advantageously the quenching is accomplished by passing the hot newly formed film directly from the calendering operation to a quenching assembly comprising a rotating cooling drum of a non-resilient, heat conducting material such as steel and a resilient hold-down roll which serves to insure adequate contact between the film and the cooling drum. Other quenching means such as a cold air stream or a cold liquid bath are also satisfactory.

Whatever the cooling means employed, the quenching operation must be performed immediately and accomplished rapidly. Unless no more than a few seconds elapses from the time the film is stripped from the last calender roll to the time the temperature of the film has been reduced to at least 30° C., the cracking deficiency of the film remains substantially unrelieved.

Although immediate and rapid chilling of the film is essential to the production of a suitable product, it will be readily obvious to those skilled in the art that a maximum time interval applicable to all embodiments of the present process cannot be precisely stated. Although I do not wish to be bound by any particular theory, it is believed that the severe stress cracking problem encountered in prior attempts to produce calendered film is to some degree caused by an undesirably large amount and unfavorable arrangement of spherulities in the film. Therefore a rapid and immediate lowering of the temperature of the film through the range most conducive to spherulite formation and growth allows a somewhat longer critical time period during which an ultimate temperature of not more than 30° C. must be attained. In any event, however, the uncomplicated nature of the basic process embodiment of this invention permits the accomplishment of the chilling operation of the order of 1 to 2 seconds. Such a time period has been found to be entirely satisfactory with regard to chilling, it was highly unexpected to find that once the newly formed film has been permitted to cool without the particular quenching step of this invention, subsequent reheating of the film to various temperatures ranging even up to the melting point followed by rapid quenching to 30° C. or lower does not increase the resistance of the film toward cracking.

By way of further description of the overall process of this invention, a preferred embodiment is shown schematically in FIG. 1 of the drawings. Using an inverted L-type four roll calender having roll temperatures as hereinbefore set forth, a fluxed resin mass of poly(ethylene oxide) is fed to the nip formed between the offset roll 10 and the ante-penultimate roll 12. The emerging continuum is fed successively through the nip between the ante-penultimate roll 12 and the penultimate roll 14 and the nip between the penultimate roll 14 and last roll 16 whereby a reduction in thickness is accomplished and the ultimate uniform film is formed. Since poly(ethylene oxide) preferentially follows the hot roll, and since the last roll is, according to the process, preferably about 4 to 5° C. hotter than the penultimate roll, the film is stripped from the last roll 16 and fed to a quenching means here shown as a cooling drum 18, where the film is quenched and subsequently wound on a spool for storage (wind up spool not shown). Good thermal contact between the hot film and the cooling drum 18 is aided by a hold-down roll 20, preferably of a resilient material and advantageously of a resilient silicone rubber. Hold-down roll pressures of from about 2 to about 20 pounds per lineal inch have been found to be quite effective.

The lower the temperature of the cooling drum, or other cooling media utilized, the better. In practice the optimum coolant temperature depends upon such factors as the speed of the film emerging from the calendering operation which can be as high as 200 feet per minute or even higher, the thickness of the film, the efficiency of the contact between the film and the cooling medium, and the time interval of contact. Thus while it is generally preferred to maintain the cooling medium at a temperature in the range of between about −20° C. and +20° C. largely for reasons of operating convenience and process economy, temperatures well below −20° C. or up to about +30° C. can be used as particular circumstances warrant.

The following examples will serve to further illustrate and describe the practice of this invention.

EXAMPLES 1–6

In each of six experiments, a two pound batch of poly(ethylene oxide) was fluxed and sheeted, and then milled for a period of 3 to 4 minutes, and then fed to a four-roll calender of the inverted L-type shown in FIG. 1 having offset, ante-penultimate, penultimate and last roll preheated to 145° C., 120° C., 80° C. and 85° C., respectively. The hot film so produced, at the rate of 25 ft./min., was passed from the last calender roll directly onto a rotating steel cooling drum located so that the span of the unsupported film travel was about one foot. The film was urged into intimate contact with the cooling drum by a rotating, rubber coated, hold-down roll on which the holddown pressure could be regulated. The resulting film was collected and subsequently examined for cracking failure. The operating variables and the cracking behavior of the respective film rolls are shown in Table I below.

*Table I*

| Example No. | Resin Viscosity [a] (cps.) | 2-Roll Mill Temp. (° C.) | Film Thickness (mils) | Cooling Drum Temp. (° C.) | Hold-down Pressure (lbs./lineal in.) | Film Roll Cracking |
|---|---|---|---|---|---|---|
| 1 | 3,000 | 100 | 2 | 15 | 10 | none.[b] |
| 2 | 3,000 | 100 | 2 | 30 | 2 | Do.[c] |
| 3 | 3,000 | 100 | 2 | 35 | 2 | extensive.[d] |
| 4 | 14,000 | 140 | 2 | 23 | 19 | none.[b] |
| 5 | 25,000 | 160 | 3 | 15 | 19 | Do.[b] |
| 6 | 40,000 | 160 | 3 | 15 | 19 | Do.[b] |

[a] At 23° C., of 0.1% sol. of resin in water.
[b] Of any magnitude even after three months.
[c] Rolls wound under normal tension.
[d] Within 1 day; even rolls wound under normal tension.

The films of Examples 1, 2, 4 and 5 had smooth, even surfaces and uniform appearance and were of good quality. The film of Example 3 was ruined by the extreme cracking and splitting. The film of Example 6, while devoid of cracks, was somewhat less uniform in appearance than Examples 1, 2, 4 and 5, because of the extreme stiffness of the high molecular weight resin used.

EXAMPLE 7

A poly(ethylene oxide) resin having a solution viscosity of 1,000 centipoises was calendered into 2 mil film and quenched by the procedure of Examples 1–6 except that the calender roll temperatures were 5° C. lower, i.e., 140° C., 115°, 75° and 80° respectively. The resin was somewhat tacky and film release was therefore more difficult than in Examples 1 through 6. This caused film appearance to be marginal, i.e., patterns developed on the film surface, but the film roll showed no strain cracking after three months.

EXAMPLES 8–15

In each of these examples 27 pounds of a poly(ethylene oxide) resin having a solution viscosity of 3,000 centipoises was mixed and fluxed in a Banbury mixer for about 5–6 minutes, then fluxed and sheeted on an 18″ x 48″, two-roll mill at 120° C., then fed in portions to an 18″ x 48″, four-roll, inverted L-type calender of the type shown in FIG. 1. The calender roll temperature and speeds used in the individual examples and the thicknesses of the respective films are shown in Table II. In each case, the hot film from the last calender roll was passed immediately onto a rotating steel cooling drum, the surface temperature of which was 15° C., and urged into intimate and uniform contact with said drum by a rotating, rubber coated roll bearing against it with a pressure of 10 lbs./lineal inch. The quenched films were collected into rolls and carefully examined for appearance, quality and crack resistance.

All of the foregoing products had good crack resistance, as shown by the absence of cracks in the film rolls after several months. The appearance and other attributes of the films and the relationships between these and calender roll temperatures appear in Table II.

*Table II*

| Example No. | Calender Roll Temperature (° C.) | | | | Film Speed (ft./min.) | Film Thickness (mils) | Film Appearance and Quality |
|---|---|---|---|---|---|---|---|
| | Offset | Ante-penultimate | Penultimate | Last | | | |
| 8 | 150 | 115 | 80 | 85 | 50 | 5.0 | good.[a] |
| 9 | 150 | 115 | 80 | 85 | 50 | 3.0 | Do.[a] |
| 10 | 150 | 115 | 80 | 85 | 75 | 1.5 | Do.[a] |
| 11 | 150 | 115 | 80 | 85 | 50 | 1.0 | fair.[a] |
| 12 | 145 | 120 | 88 | 90 | 50 | 5.0 | good.[b] |
| 13 | 145 | 125 | 85 | 80 | 50 | 5.0 | poor.[c] |
| 14 | 145 | 120 | 70 | 65 | 50 | 5.0 | very poor.[d] |
| 15 | 145 | 120 | 95 | 100 | 50 | 5.0 | Do.[e] |

[a] film released cleanly and readily from all calender rolls.
[b] film release from penultimate last roll not quite as good as in Example 8.
[c] i.e., patterned surface, due to poor release from middle to bottom roll.
[d] higher penultimate and last roll temperature needed.
[e] severe release problem on penultimate and last rolls.

The poly(ethylene oxide) films produced by the rocess of this invention have extensive application in the field of water soluble packaging. The uses include the packaging of toxic agricultural chemicals, inks, paints, soap and detergent powders, water softeners, dehydrated food stuffs, as well as seed and drug encapsulations.

Optimum results are achieved using the present process when the final film thickness is within the range of from about 1 to about 8 mils. Films having a thickness of 12 mils and even greater are readily attainable, however.

The properties of the final film product can, of course, be modified by the addition of conventional pigments, fillers, plasticizers and the like to the base poly(ethylene oxide) resin prior to the film-forming calendering operation. As will be readily understood by those skilled in the art, the use of considerable quantities of certain additives, particularly plasticizers, may necessitate a slight departure from the precise temperature conditions set forth hereinbefore. The principles described and illustrated will not however be departed from, and for this reason such slight departures are deemed to be within the spirit and proper scope of the invention.

The unmodified calendered film, however, processes excellent properties and is most advantageously utilized. Physical properties of a typical 2.5 mil thick unmodified film produced according to Example 1 from a poly(ethylene oxide) resin having a solution viscosity of 3,000 centipoises are set forth below.

| Property | Value |
| --- | --- |
| Thickness | 2.5 mils. |
| Tensile strength (M.D.[1]) | 1,970 p.s.i. |
| Tensile strength (T.D.[2]) | 1,730 p.s.i. |
| Elongation (M.D.) | 690 percent. |
| Elongation (T.D.) | 790 percent. |
| Elmendorf tear strength (M.D.) | 630 gms./mil. |
| Elmendorf tear strength (T.D.) | 770 gms./mil. |
| Graves tear strength (M.D.) | 570 lb./in. |
| Graves tear strength (T.D.) | 720 lb./in. |
| Tensile impact strength (M.D.) | 1,130 ft.-lb./in.$^3$. |
| Tensile impact strength (T.D.) | 220 ft.-lb./in.$^3$. |
| Masland cold crack | No failure at $-70°$ C. |
| Gas permeability (oxygen) | 283 cc./mil/100 in.-2/24 hrs. |
| Gas permeability ($CO_2$) | 5,400 cc./mil/100 in.-2/24 hrs. |

[1] Machine direction.
[2] Transverse direction.

What is claimed is:

1. The method for producing poly(ethylene oxide) film which comprises fluxing an ethylene oxide homopolymer resin having a solution viscosity in the range of from about 1,000 to about 40,000 centipoises, calendering said fluxed resin by passing it successively through the nips between each adjacent pair of a series of at least three counter-rotating surfacing rolls while maintaining the last roll and the penultimate roll at a temperature in the range of from about 70° C. to 95° C. with the proviso that said last roll has a temperature higher than said penultimate roll, and while maintaining the ante-penultimate roll at a temperature from about 20° C. to about 50° C. higher than the said penultimate roll, to form a film continuum and immediately thereafter rapidly chilling said film continuum to a temperature below about 30° C.

2. The method for producing poly(ethylene oxide) film according to claim 1 wherein the ethylene oxide homopolymer has a solution viscosity in the range of about 2,500 to about 25,000 centipoises.

3. The method for producing poly(ethylene oxide) film according to claim 2 wherein the temperature of the penultimate roll is maintained at a temperature between about 78 to 82° C., the last roll is maintained at a temperature about 4° C. to about 5° C. higher than the penultimate roll, and the ante-penultimate roll is maintained at a temperature from about 30° C. to about 40° C. higher than the penultimate roll.

4. The method for producing poly(ethylene oxide) film according to claim 3 where in the poly(ethylene oxide) is fluxed at a temperature from about 80° C. to about 160° C. for a period of from about 5 to about 15 minutes immediately prior to being fed to the nip between the first pair of calender rolls.

References Cited in the file of this patent

UNITED STATES PATENTS

| | | |
| --- | --- | --- |
| 2,586,820 | Hemperly et al. | Feb. 26, 1952 |
| 2,771,388 | Rocky et al. | Nov. 20, 1956 |
| 2,879,547 | Morris | Mar. 21, 1959 |